(12) United States Patent
Manthiram et al.

(10) Patent No.: US 6,268,085 B1
(45) Date of Patent: Jul. 31, 2001

(54) COMPOSITE MANGANESE OXIDE CATHODES FOR RECHARGEABLE LITHIUM BATTERIES

(75) Inventors: Arumugam Manthiram; Jaekook Kim, both of Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 0 days.

(21) Appl. No.: 09/283,319

(22) Filed: Mar. 31, 1999

Related U.S. Application Data

(60) Provisional application No. 60/080,160, filed on Mar. 31, 1998.

(51) Int. Cl.⁷ ................................................. H01M 4/50
(52) U.S. Cl. ...................... 429/224; 429/223; 429/231.95
(58) Field of Search ................................. 429/224, 223, 429/231.95

(56) References Cited

U.S. PATENT DOCUMENTS

| | | | |
|---|---|---|---|
| 4,828,834 | 5/1989 | Nagaura et al. | 429/194 |
| 4,980,251 | 12/1990 | Thackeray et al. | 429/224 |
| 5,135,732 | 8/1992 | Barboux et al. | 423/593 |
| 5,211,933 | 5/1993 | Barboux et al. | 423/596 |
| 5,240,794 | 8/1993 | Thackeray et al. | 429/224 |
| 5,419,986 | 5/1995 | Kainthla et al. | 429/224 |
| 5,558,961 | * 9/1996 | Doeff et al. | 429/224 |
| 5,569,561 | * 10/1996 | Exnar et al. | 429/218.1 |
| 5,680,685 | 10/1997 | Bischoff | 29/25.42 |

OTHER PUBLICATIONS

Armstrong and Bruce, "Synthesis of layered LiMnO₂ as an electrode for rechargeable lithium batteries," *Nature*, 381:499–500, 1996.

Doeff et al., "Lithium insertion processes of orthorhombic Na$_x$MnO$_2$–based electrode materials," *J. Electrochem. Soc.*, 143:2507–2516, 1996.

Doeff et al., "Orthorhombic Na$_x$MnO$_2$ as a cathode material for secondary sodium lithium polymer batteries," *J. Electrochem. Soc.*, 141:L145–L147, 1994.

Leroux et al., "The 2D rancieite–type manganic acid and its alkali–exchanged derivatives: part II—electrochemical behavior," *Solid State Ionics*, 80:307–316, 19995.

Ma et al., "Rechargeable Na/Na$_x$CoO$_2$ and Na$_{15}$Pb$_4$/Na$_x$CoO$_2$ polymer electrolyte cells," *J. Electrochem. Soc.*, 140:2726–2733, 1993.

Nagaura and Tozawa, "Lithium ion rechargeable battery," *Prog. Batteries Sol. Cells*, 9:209–217, 1990.

Scrosati, "Lithium rocking chair batteries: an old concept?," *J. Electrochem. Soc.*, 139:2776–2781, 1992.

Tarascon et al., "Synthesis conditions and oxygen stoichiometry effects on Li insertion into the spinel LiMn$_2$O$_4$," *J. Electrochem. Soc.*, 141:1421–1431, 1994.

Thackeray et al., "Lithium insertion into manganese spinels," *Mat. Res. Bull.*, 18:461–471, 1983.

Tsang and Manthiram, "A new route for the synthesis of LiMn$_2$O$_4$ cathode: variation of composition, microstructure, and electrochemical behavior with synthesis temperature," *Solid State Ionics*, 89:205–312, 1996.

Vitins and West, "Lithium intercalation into layered LiMnO$_2$," *J. Electrochem. Soc.*, 144:2587–2592, 1997.

* cited by examiner

*Primary Examiner*—Laura Weiner
(74) *Attorney, Agent, or Firm*—Fulbright & Jaworski, LLP

(57) ABSTRACT

A composite electrode and process of making. The composite includes a mixture of nanometer size particles of the lithium spinel oxide, $Li_{1+x}Mn_{2-x}O_{4+\delta}$, and $Na_yMnO_2$, where $0 \leq x \leq 0.33$ and $0 \leq \delta \leq 0.5$ and $0 \leq y \leq 1.0$.

40 Claims, 8 Drawing Sheets

US 6,268,085 B1

COMPOSITE MANGANESE OXIDE CATHODES FOR RECHARGEABLE LITHIUM BATTERIES

This application claims priority to provisional patent application Serial No. 60/080,160 filed Mar. 31, 1998, entitled "Composite Manganese Oxide Cathodes For Rechargeable Lithium Batteries," by Arumugam Manthiram and Jaekook Kim. The entire text of the above-referenced disclosure is specifically incorporated by reference herein without disclaimer.

The government may own rights in the present invention pursuant to grant number DMR-9401999 from the National Science Foundation.

BACKGROUND OF THE INVENTION

1. Field of the Invention

The present invention relates generally to compositions useful for energy conversion and storage. More particularly, it concerns a method of preparing a composite cathode suitable for use in lithium batteries. The composite cathode includes nanometer size particles of a lithium spinel oxide and a sodium manganese oxide.

2. Description of Related Art

Commercially available rechargeable lithium batteries often use lithium cobalt oxide as the cathode (Nagaura and Tozawa, 1990; Scrosati, 1992). But cobalt is expensive and relatively toxic. The high cost and toxicity of cobalt-based cathodes have created tremendous interest in the development of manganese-based cathodes, because manganese is much less expensive than cobalt and environmentally benign. In this regard, the spinel lithium manganese oxide $LiMn_2O_4$ has been investigated extensively over the years (Thackeray et al., 1983; Tarascon et al., 1994).

$LiMn_2O_4$ shows two plateaus in voltage versus capacity plots, one at around 4 V and the other at around 3 V. While the 4 V region generally shows good cyclability with a capacity of <120 mAh/g, the 3 V region exhibits drastic capacity fading upon cycling due to the macroscopic volume change associated with a cooperative Jahn-Teller distortion. As a result, the capacity in the 3 V region of the stoichiometric $LiMn_2O_4$ spinel (about 150 mAh/g, theoretically) cannot be utilized. More recently, attention has been focused on the synthesis of layered $LiMnO_2$, but this material shows poor cyclability due to the transformation of the layer structure to the spinel structure upon prolonged cycling (Armstrong and Bruce, 1996; Vintins and West, 1997).

SUMMARY OF THE INVENTION

Described herein is a composite electrode and method of making same that addresses problems associated with $LiMn_2O_4$ spinel cathodes. The composite in one embodiment comprises a mixture of nanometer size particles of a lithium spinel oxide, $Li_{1+x}Mn_{2-x}O_{4+\delta}$, and a sodium manganese oxide, $Na_yMnO_2$, where, in one embodiment, $0 \leq x \leq 0.33$, $0 \leq \delta \leq 0.5$, and $0 \leq y \leq 1.0$. Although the presence of excess oxygen (or cation vacancies), and possibly a substitution of some lithium for manganese in $Li_{1+x}Mn_{2-x}O_{4+\delta}$, may reduce the capacity of the 4 V region, the capacity contribution from $Na_yMnO_2$ leads to, in one embodiment, an overall reversible capacity of about 200 mAh/g in the range 4.3–2.3 V. Advantageously, this translates into an energy density that may exceed that of the currently utilized lithium cobalt oxide.

Advantageously, the presence of sodium manganese oxide $Na_yMnO_2$, on a nanometer scale, in a nanocomposite may help to overcome the difficulties posed by Jahn-Teller distortion and may lead to better cyclability in the 3 V region of the $LiMn_2O_4$ spinel. A nanometer scale mixing of the component oxides in the composite is achieved, in one embodiment, by a solution-based chemical procedure. The procedure, in one embodiment, involves the reduction of sodium permanganate by lithium iodide at ambient temperatures in aqueous solutions followed by heating the product at around 500° C. in air. The relative amounts of $Li_{1+x}Mn_{2-x}O_{4+\delta}$ and $Na_yMnO_2$ in the composite may be altered by changing the ratio of the reactants in the synthesis. Also, in one embodiment, sodium in $Na_yMnO_2$ may be ion-exchanged with a lithium salt such as $LiCF_3SO_3$ to give $Na_{y-\eta}Li_\eta MnO_{2+\delta}$ ($0 \leq \eta \leq y$, where $0 \leq y \leq 1.0$) or extracted with an oxidizing agent such as iodine to give $Na_{y-\eta}MnO_{2+\delta}$ ($0 \leq \eta \leq y$, where $0 \leq y \leq 1.0$).

The electrochemical performance of the composite depends on the relative amounts of the two phases and the particle size, which in turn may be controlled by the firing temperature. It is contemplated that compositions manufactured according to the methods disclosed herein may exhibit excellent performance as cathodes in rechargeable lithium batteries. The composites may exhibit a capacity of about 200 mAh/g with excellent electrochemical cyclability in the range 4.3–2.3 V.

In one embodiment, reduction of sodium permanganate with sodium iodide instead of lithium iodide with appropriate modifications in quantity may be used to obtain $Na_yMnO_{2+\delta}$ ($0 \leq y \leq 1.0$ and $0 \leq \delta \leq 0.5$). $Na_yMnO_{2+\delta}$ crystallizes in layer, tunnel or other structures depending on the value of x and δ and the firing temperature, which in one embodiment may be about 200° C. $\leq T \leq$ 900° C. Ion exchange reactions of $Na_yMnO_{2+\delta}$ with lithium salts such as $LiCF_3SO_3$ or oxidative extraction of sodium with oxidizing agents such as iodine from $Na_yMnO_{2+\delta}$ give $Na_{y-\eta}Li_\eta MnO_{2+\delta}$ and $Na_{y-\eta}MnO_{2+\delta}$, respectively. $Na_{0.44}MnO_2$ cathodes with a tunnel structure are known to exhibit remarkable stability without transforming to spinel structure (Doeff et al., 1994; Doeff et al., 1996). $Na_yMnO_{2+\delta}$, $Na_{y-\eta}Li_\eta MnO_{2+\delta}$ and $Na_{y-\eta}MnO_{2+\delta}$ ($0 \leq y \leq 1$, $0 \leq \eta \leq 1$ and $0 \leq \delta \leq 0.5$) cathodes obtained by procedures described herein exhibit high capacity with good electrochemical cyclability in lithium cells.

In one respect, the invention is a composite electrode material including a composite mixture of $Li_{1+x}Mn_{2-x}O_{4+\delta}$ and $Na_yMnO_2$, where $0 \leq x \leq 0.33$, $0 \leq \delta \leq 0.5$ and $0 \leq y \leq 1$.

In other aspects, the $Li_{1+x}Mn_{2-x}O_{4+\delta}$ and the $Na_yMnO_2$ may include nanometer size particles. As used herein, by "nanometer size particles", or by "nanometer scale", or by "nanocomposite" it is meant to refer to a range of sizes between about 5 nanometers and about 500 nanometers in diameter. The electrode material may include an oxidation state of manganese that lies in a range from about 3.0+ to about 4.0+.

In another respect, the invention is an electrode material including a two-phase composition of $Li_{1+x}Mn_{2-x}O_{4+\delta}$ and $Na_yMnO_2$, where $0 \leq x \leq 0.33$, $0 \leq \delta \leq 0.5$ and $0 \leq y \leq 1.0$. The electrode material is prepared by a process including obtaining aqueous solutions of $NaMnO_4 \cdot H_2O$ and $LiI \cdot 3H_2O$ at ambient temperatures; mixing the aqueous solutions together to obtain a precipitate; and heating the precipitate to from about 400° C. to about 800° C. for a period of time sufficient to form $Li_{1+x}Mn_{2-x}O_{4+\delta}$ and $Na_yMnO_2$ in two phases.

In other aspects, the heating may include heating the precipitate to from about 500° C. to about 800° C. for a period of time sufficient to form $Li_{1+x}Mn_{2-x}O_{4+\delta}$ and $Na_yMnO_2$ in two phases. The heating may include heating the precipitate to about 500° C. for a period of time sufficient to form $Li_{1+x}Mn_{2-x}O_{4+\delta}$ and $Na_yMnO_2$ in two phases. The process may also include ion exchange of sodium in the $Na_yMnO_2$ with a lithium salt. The lithium salt may include $LiCF_3SO_3$ to produce $Na_{y-\eta}Li_\eta MnO_{2+\delta}$, wherein $0 \leq \eta \leq y$. The process may also include extraction of sodium in the $Na_yMnO_2$ with an oxidizing agent. The oxidizing agent may include iodine to produce $Na_{y-\eta}MnO_{2+\delta}$, wherein $0 \leq \eta \leq y$. The precipitate may be heated for about 24 hours in air. The precipitate may be heated for about 3 days in air. The molar ratio of $NaMnO_4 \cdot H_2O:LiI \cdot 3H_2O$ may be about 1:0.5. The molar ratio of $NaMnO_4 \cdot H_2O:LiI \cdot 3H_2O$ may be about 1:1. The molar ratio of $NaMnO_4 \cdot H_2O:LiI \cdot 3H_2O$ may be about 1:2. The molar ratio of $NaMnO_4 \cdot H_2O:LiI \cdot 3H_2O$ may be about 1:4. The molar ratio of $NaMnO_4 \cdot H_2O:LiI \cdot 3H_2O$ may be about 1:8.

In another respect, the invention is an electrode material including $Na_yMnO_{2+\delta}$, wherein $0 \leq y \leq 1.0$ and $0 \leq \delta \leq 0.5$. The electrode material is prepared by a process including obtaining aqueous solutions of $NaMnO_4 \cdot H_2O$ and $NaI$ at ambient temperatures; mixing the aqueous solutions together to obtain a precipitate; and heating the precipitate to from about 400° C. to about 800° C. for a period sufficient to form $Na_yMnO_{2+\delta}$.

In other aspects, the heating may include heating the precipitate to from about 500° C. to about 800° C. for a period sufficient to form $Na_yMnO_{2+\delta}$. The heating may include heating the precipitate to about 500° C. for a period sufficient to form $Na_yMnO_{2+\delta}$. The precipitate may be heated in air. The precipitate may be heated in nitrogen. The process may also include ion exchange of sodium in the $Na_yMnO_{2+\delta}$ with a lithium salt. The lithium salt may include $LiCF_3SO_3$ to produce $Na_{y-\eta}Li_\eta MnO_{2+\delta}$, wherein $0 \leq \eta \leq y$. The process may also include extraction of sodium in the $Na_yMnO_{2+\delta}$ with an oxidizing agent. The oxidizing agent may include iodine to produce $Na_{y-\eta}MnO_{2+\delta}$, wherein $0 \leq \eta \leq y$.

In another respect, the invention is a process for producing a two phase composition of $Li_{1+x}Mn_{2-x}O_{4+\delta}$ and $Na_yMnO_2$. The process includes obtaining aqueous solutions of $NaMnO_4 \cdot H_2O$ and $LiI \cdot 3H_2O$ at ambient temperatures; mixing the aqueous solutions together to obtain a precipitate; and heating the precipitate to from about 400° C. to about 800° C. for a period of time sufficient to form $Li_{1+x}Mn_{2-x}O_{4+\delta}$ and $Na_yMnO_2$ in two phases.

In other aspects, the heating may include heating the precipitate to from about 500° C. to about 800° C. for a period of time sufficient to form $Li_{1+x}Mn_{2-x}O_{4+\delta}$ and $Na_yMnO_2$ in two phases. The heating may include heating the precipitate to about 500° C. for a period of time sufficient to form $Li_{1+x}Mn_{2-x}O_{4+\delta}$ and $Na_yMnO_2$ in two phases. The precipitate may be heated in nitrogen. The molar ratio of $NaMnO_4 \cdot H_2O:LiI \cdot 3H_2O$ may be about 1:0.5. The molar ratio of $NaMnO_4 \cdot H_2O:LiI \cdot 3H_2O$ may be about 1:1. The molar ratio of $NaMnO_4 \cdot H_2O:LiI \cdot 3H_2O$ may be about 1:2. The molar ratio of $NaMnO_4 \cdot H_2O:LiI \cdot 3H_2O$ may be about 1:4. The molar ratio of $NaMnO_4 \cdot H_2O:LiI \cdot 3H_2O$ may be about 1:8. The precipitate may be heated in air. The precipitate may be heated to about 500° C. for about 24 h. The precipitate may be heated to about 500° C. for about 3 days. The precipitate may be heated to about 700° C. for about 24 hours. The precipitate may be heated to about 800° C. for about 24 h.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
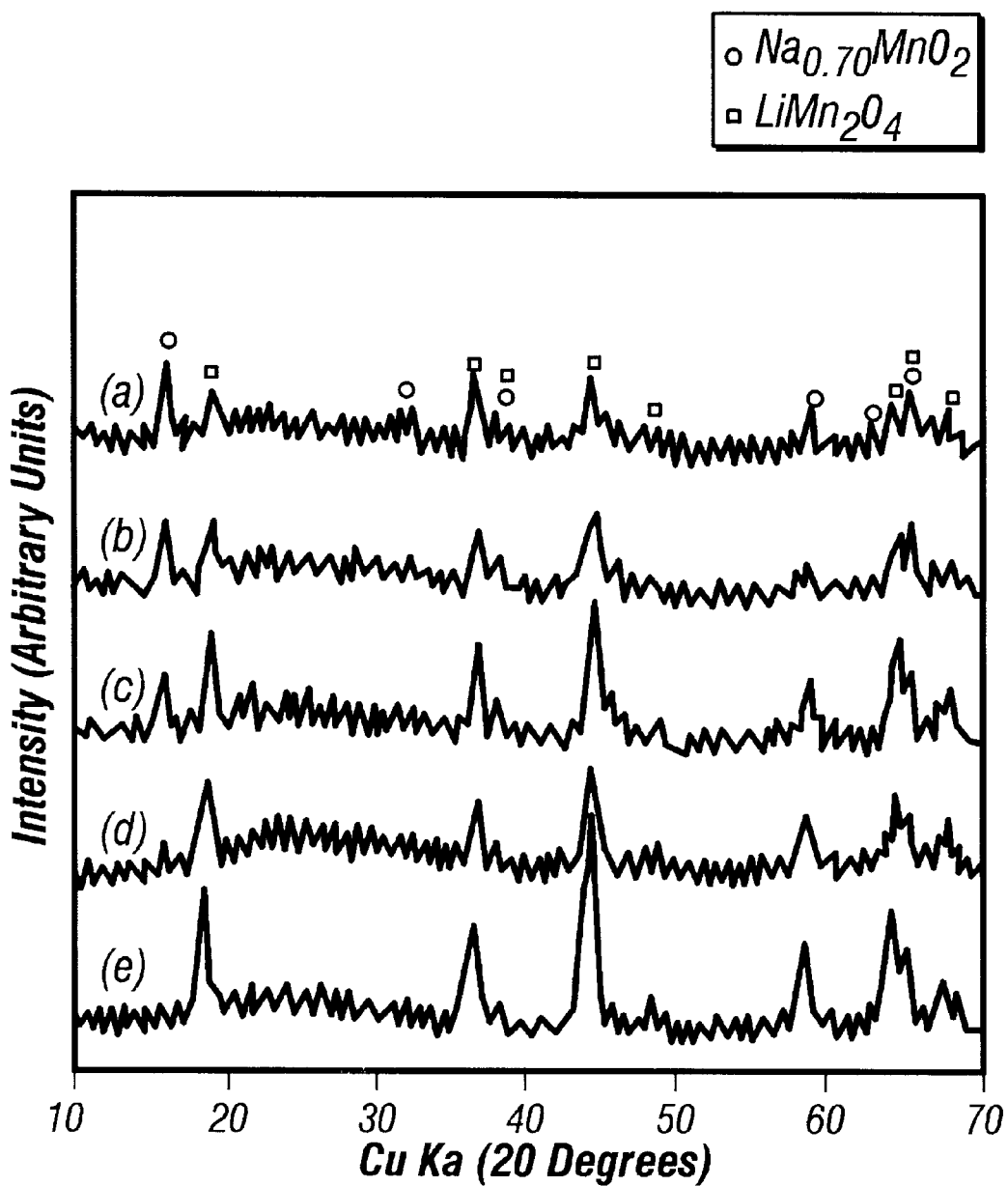
FIG. 1 shows x-ray patterns recorded after heating at 500° C. in air: (a) sample MNW1, (b) sample MNW2, (c) sample MNW3, (d) sample MNW4 and (e) sample MNW5.

In one embodiment, sodium permanganate is reduced by lithium iodide at ambient temperatures in aqueous solutions. Alternatively, the reducing agent may be one or more suitable alkali metal iodides, including, but not limited to, sodium iodide, potassium iodide, or mixtures thereof. In another embodiment, rather than sodium permanganate, a suitable alkali metal permanganate salt, including, but not limited to, potassium permanganate, lithium permanganate, or mixtures thereof may be used. In one embodiment, following the reduction, the resulting substance may be heat treated. In one embodiment, the product may be heated at around 500° C. in air. In other embodiments, the heating temperature may range from about 400° C. to about 800° C. With the benefit of the present disclosure, those of skill in the art will understand that heating may be carried forth under different conditions, such as under vacuum or in, for instance, a nitrogen atmosphere. Although heating times may vary widely, in one embodiment heating is carried out for about 3 days so that iodine may be sufficiently removed.

The relative amounts of $Li_{1+x}Mn_{2-x}O_{4+\delta}$ and $Na_yMnO_2$ in the resulting composite may be altered by changing the ratio of the reactants in the synthesis. Also, in one embodiment, sodium in $Na_yMnO_2$ may be ion-exchanged with a lithium salt such as $LiCF_3SO_3$ to give $Na_{y-\eta}Li_\eta MnO_{2+\delta}$ ($0 \leq \eta \leq y$, where $0 \leq y \leq 1.0$) or extracted with an oxidizing agent such as iodine to give $Na_{y-\eta}MnO_{2+\delta}$ ($0 \leq \eta \leq y$, where $0 \leq y \leq 1.0$).

In one embodiment, reduction of sodium permanganate with sodium iodide instead of lithium iodide with appropriate modifications in quantity may be used to obtain $Na_yMnO_{2+\delta}$ ($0 \leq y \leq 1.0$ and $0 \leq \delta \leq 0.5$). $Na_yMnO_{2+\delta}$ crystallizes in layer, tunnel or other structures depending on the value of x and $\delta$ and the firing temperature, which in one embodiment may be about $200° C. \leq T \leq 900° C$. Ion exchange reactions of $Na_yMnO_{2+\delta}$ with lithium salts such as $LiCF_3SO_3$ or oxidative extraction of sodium with oxidizing agents such as iodine from $Na_yMnO_{2+\delta}$ give $Na_{y-\eta}Li_\eta MnO_{2+\delta}$ and $Na_{y-\eta}MnO_{2+\delta}$, respectively. $Na_{0.44}MnO_2$ cathodes with a tunnel structure are known to exhibit remarkable stability without transforming to spinel structure (Doeff et al., 1994; Doeff et al., 1996). $Na_yMnO_{2+\delta}$, $Na_{y-\eta}Li_\eta MnO_{2+\delta}$ and $Na_{y-\eta}MnO_{2+\delta}$ ($0 \leq y \leq 1$, $0 \leq \eta \leq 1$ and $0 \leq \delta \leq 0.5$) cathodes obtained by procedures described herein exhibit high capacity with good electrochemical cyclability in lithium cells.

Electrodes for use in energy storage and conversion devices, including batteries, may be fabricated by further processing the composites disclosed herein by, for example, grinding to form an electrode. An example of forming a battery electrode and battery is described in U.S. Pat. No. 5,419,986 which is incorporated herein by reference in its entirety. As used herein, "grinding" refers to mixing, crushing, pulverizing, pressing together, polishing, reducing to powder or small fragments, milling, ball milling, or any other suitable process to wear down a material. A conducting material may be mixed with the composites in the process of forming an electrode. The conducting material may be an electrically conductive material such as carbon, which may be in the form graphite or acetylene black, but it will be understood with benefit of this disclosure that the conducting material may alternatively be any other material or mixtures of suitable materials known in the art.

Electrodes may be formed in a variety of shapes, sizes, and/or configurations as is known in the art. In one embodiment, electrodes may be formed by rolling a mixture of composites disclosed herein, conducting material, and binding material into one or more thin sheets which may be cut to form, for example, circular electrodes having an area of about 2 cm² with a thickness of about 0.2 mm and a mass of about 0.06 g. Electrochemical performance of such electrodes may be evaluated according to procedures known in the art.

Reduction experiments carried out with various molar ratios of $NaMnO_4 \cdot H_2O$ to $LiI \cdot 3H_2O$ in aqueous medium are summarized in Table 1. As-prepared samples did not show any discernible reflections in the x-ray diffraction patterns. Since the as-prepared samples were amorphous, they were heated at various temperatures. The range of chemical compositions that may be obtained after heating the samples at about 500° C. in air are given in Table 1. The lithium to sodium ratio of the samples increased as the amount of $LiI \cdot 3H_2O$ in the reaction mixture increased. Although the as-prepared samples contained some iodine, the samples fired at 500° C. for 3 days did not contain iodine.

This trend is consistent with the compositions in Table 1. However, it should be noted that the spinel formed at lower temperatures T≈500° C. are typically cation-deficient with manganese oxidation state >3.5+ (Tsang and Manthiram, 1996).

The electrochemical properties after heating the samples at 500–700° C. in air were investigated. These samples consisted of a composite of $Na_{0.70}MnO_2$ and $Li_{1+x}Mn_{2-x}O_{4+\delta}$. The discharge-charge curves of the samples fired at 500° C. are compared in FIGS. 3A–3E for the samples MNW1–MNW5. The first discharge capacity increased from MNW1 to MNW2 and then decreased from MNW2 to MNW5. In this embodiment, the sample MNW2 exhibited a high capacity of about 200 mAh/g, and it showed very favorable cyclability.

In order to understand the influence of firing temperatures, discharge-charge curves were also recorded for the sample MNW2 after firing at different temperatures. The curves recorded for samples fired at 400° C., 500° C., 600° C. and 700° C. are compared in FIGS. 4A–4D. The data from this embodiment indicate that the MNW2 sample fired at 500° C. may show the highest capacity and the best cyclability. In this embodiment, the sample fired at 700° C. showed drastic capacity decline similar to that of conventionally prepared $LiMn_2O_4$ spinel oxides.

Figure 5A:
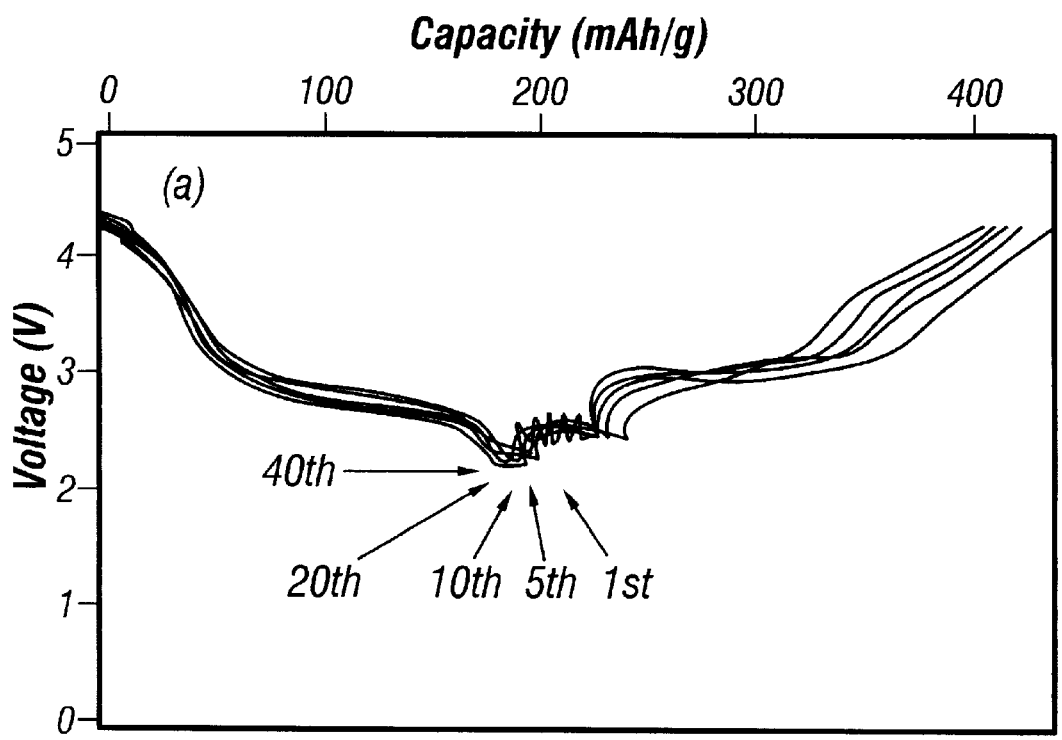
FIGS. 5A–5B show a comparison of the discharge-charge curves of the sample MNW2 after (a) firing at 500° C. in air, and (b) firing in air at 500° C. followed by firing in nitrogen at 500° C.
Figure 5B:
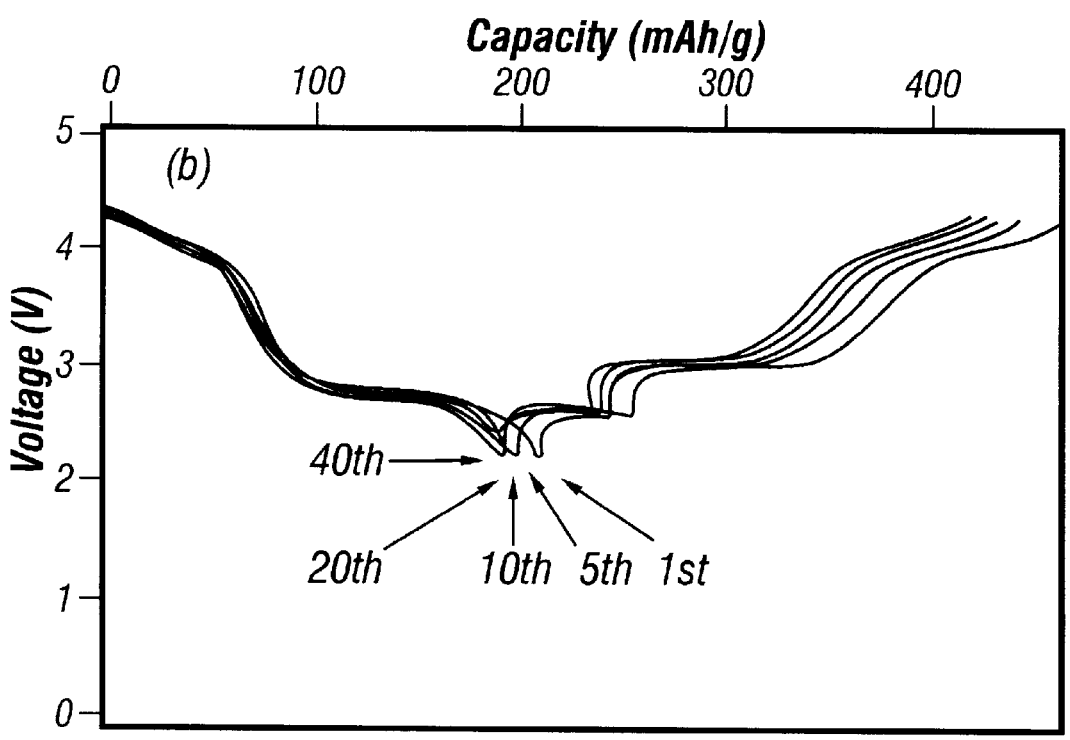

In order to investigate the influence of firing atmosphere, and hence the oxygen content, the sample MNW2 was also fired in nitrogen atmosphere at 500° C. The electrochemical cyclability of the MNW2 samples fired at 500° C. in air and nitrogen are compared in FIGS. 5A and 5B. While the sample fired in nitrogen showed a slightly larger capacity in the 4 V region than the sample fired in air, the latter sample showed a slightly larger capacity in the 3 V region than the former sample. As a result, both samples showed a similar total capacity of about 200 mAh/g with excellent cyclability.

The differences in electrochemical behavior among the various samples in FIGS. 3A–3E, FIGS. 4A–4D, and FIGS. 5A–5B may be understood, at least in part, by considering the differences in microstructure, crystallinity and relative amounts of the two phases, $Na_{0.70}MnO_2$ and $Li_{1+x}Mn_{2-x}O_{4+\delta}$. The x-ray diffraction

TABLE 1

Chemical Compositions of the Samples Synthesized in Aqueous Medium after Heating at 500° C. in Air for 1 to 3 Days

| Sample number | Molar ratio of reactants ($NaMnO_4 \cdot H_2O$:$LiI \cdot 3H_2O$) | Chemical composition* | Oxidation state of Mn | Li/Na ratio |
|---|---|---|---|---|
| MNW1 | 1:0.5 | $Li_{0.12-0.34}Na_{0.18-48}MnO_{1.65-2.41}$ | 3–4 | 0.25–1.89 |
| MNW2 | 1:1 | $Li_{0.27-0.51}Na_{0.13-0.53}MnO_{1.70-2.52}$ | 3–4 | 0.51–3.92 |
| MNW3 | 1:2 | $Li_{0.21-0.46}Na_{0.02-0.34}MnO_{1.62-2.40}$ | 3–4 | 0.62–23.00 |
| MNW4 | 1:4 | $Li_{0.28-0.54}Na_{0.00-0.28}MnO_{1.64-2.41}$ | 3–4 | 1.00–∞ |
| MNW5 | 1:8 | $Li_{0.25-0.56}Na_{0.00-0.24}MnO_{1.63-2.40}$ | 3–4 | 1.04–∞ |

*Although composition is expressed as a single phase, the samples consist of $Na_{0.70}MnO_2$ and spinel $Li_{1+x}Mn_{2-x}O_{4+\delta}$ as indicated by x-ray diffraction.

Figure 2:
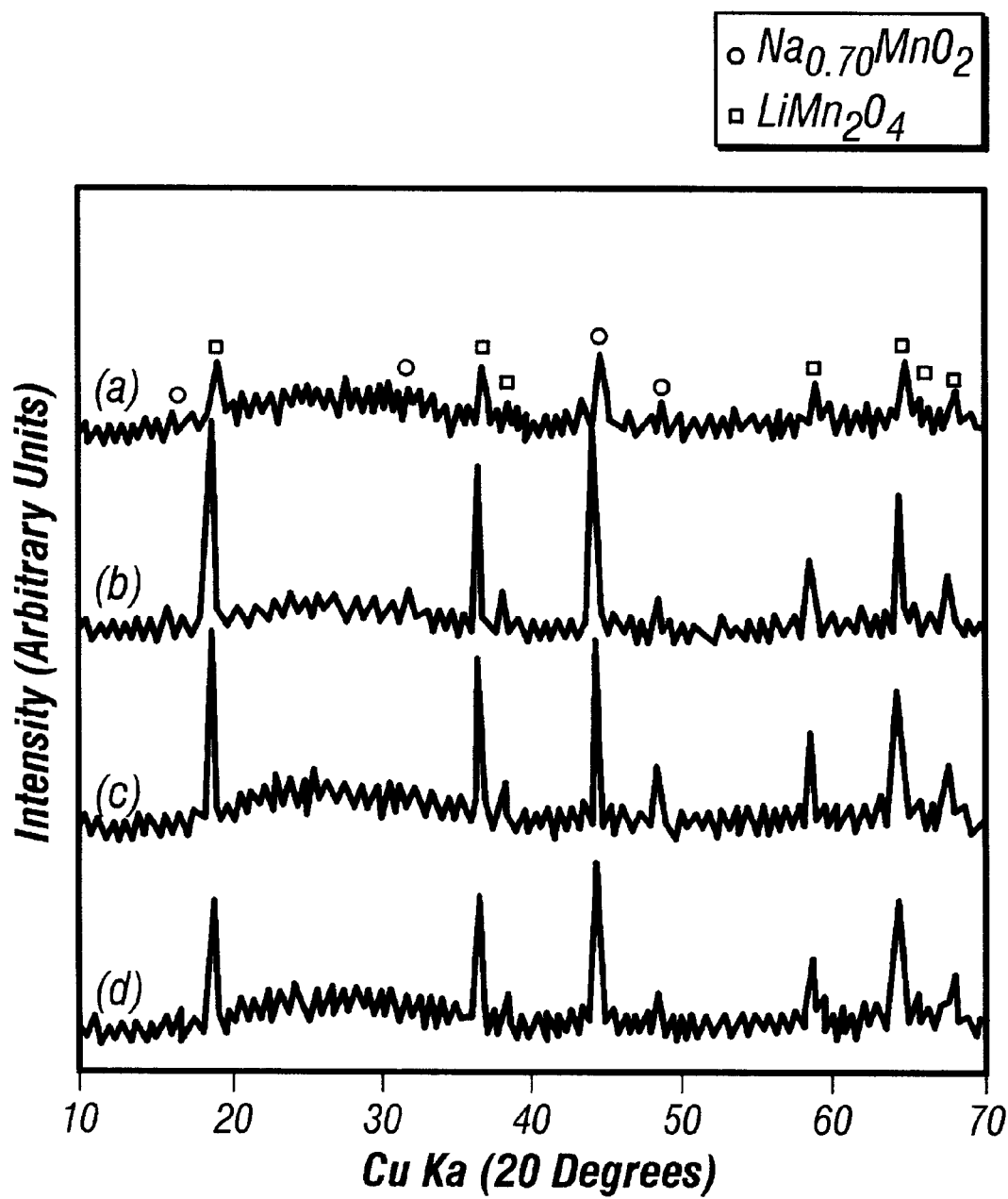
FIG. 2 shows x-ray patterns of samples MNW4 and MNW5 after heating: (a) MNW4 after heating at 700° C., (b) MNW4 after heating at 800° C., (c) MNW5 after heating at 700° C. and (d) MNW5 after heating at 800° C.
Figure 3A:
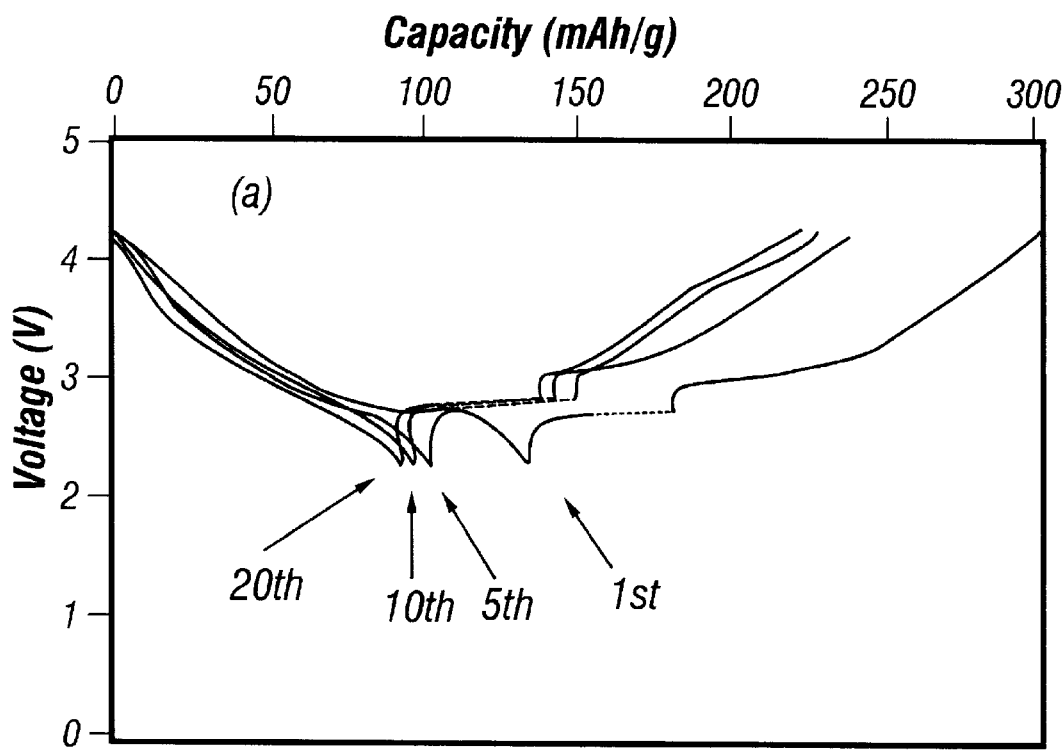
FIGS. 3A–3E show discharge-charge curves of the samples after firing at 500° C.: (a) MNW1, (b) MNW2, (c) MNW3, (d) MNW4, and (e) MNW5.
Figure 3B:
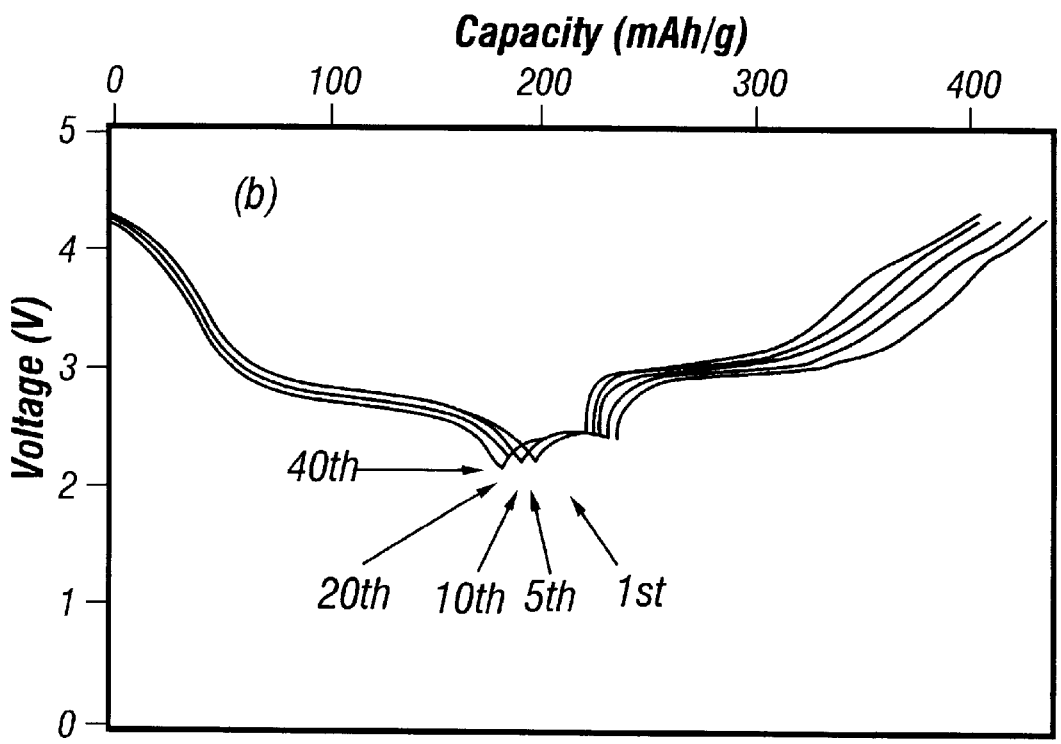
Figure 3C:
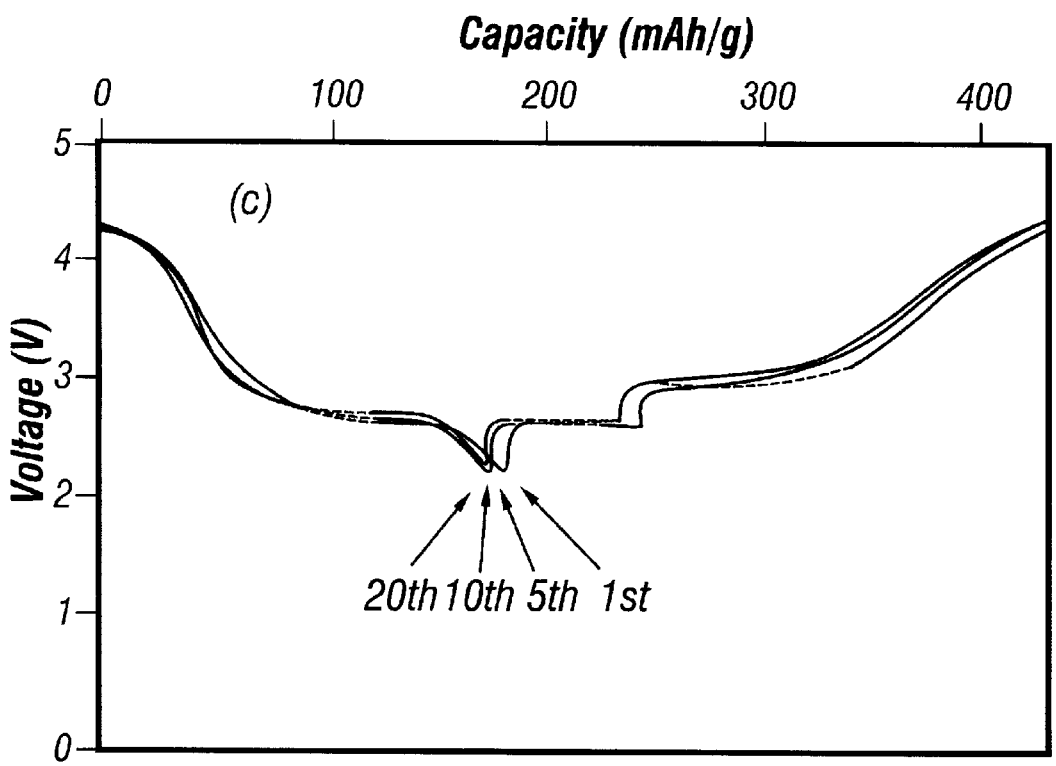
Figure 3D:
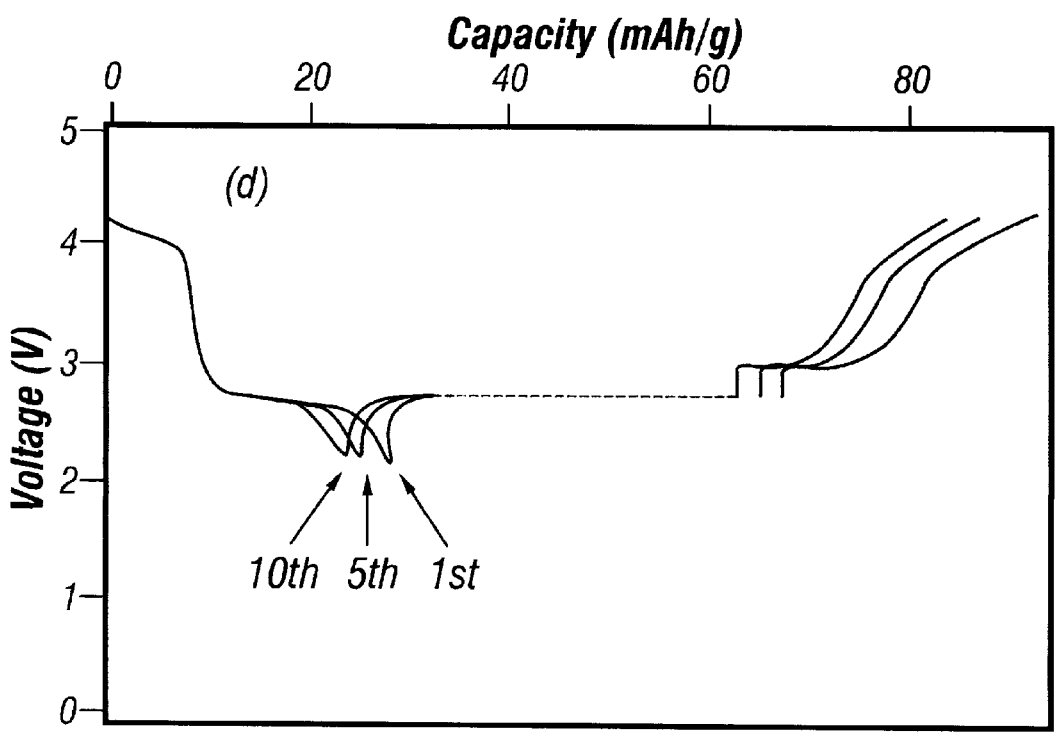
Figure 3E:
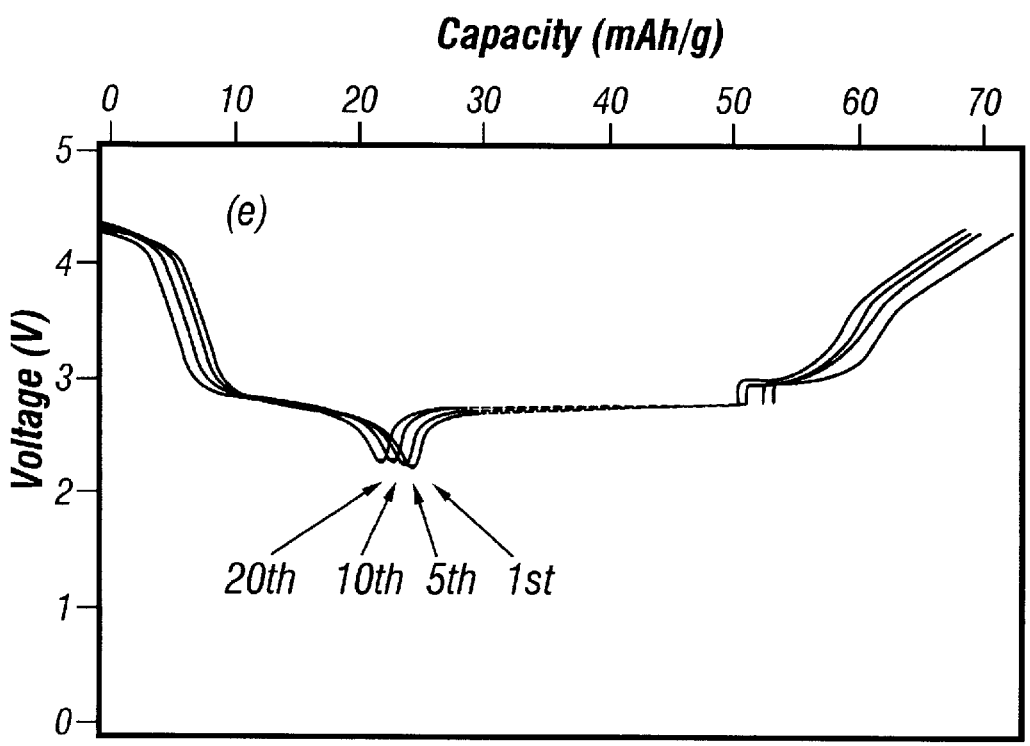
Figure 4A:
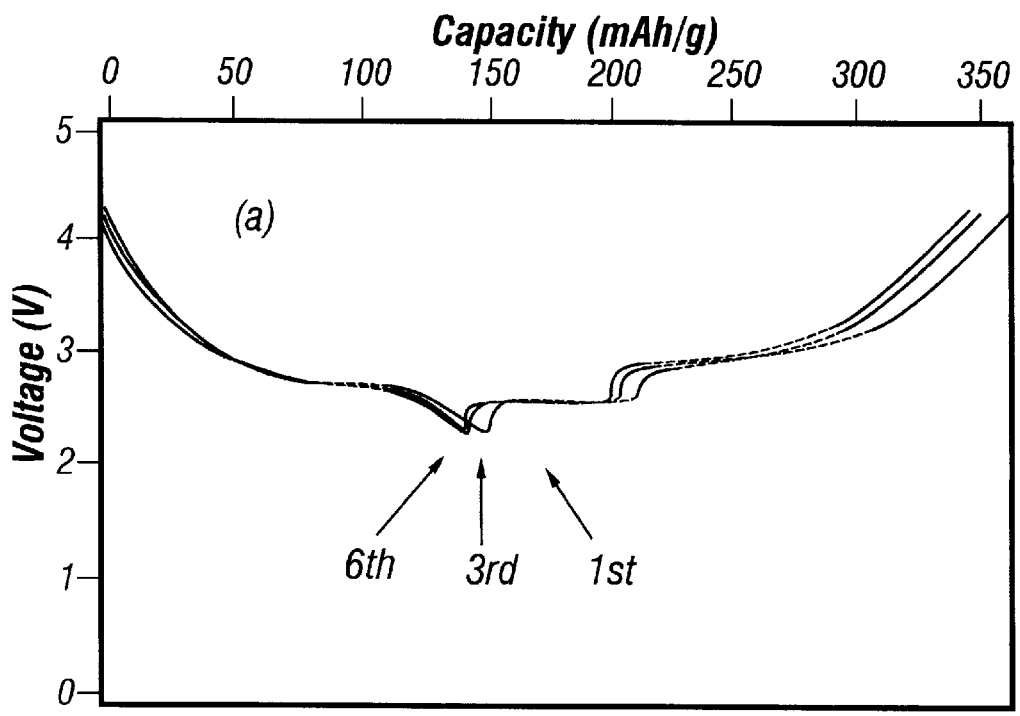
FIGS. 4A–4D show discharge-charge curves of the sample MNW2 after firing at (a) 400° C., (b) 500° C., (c) 600° C., and (d) 700° C.
Figure 4B:
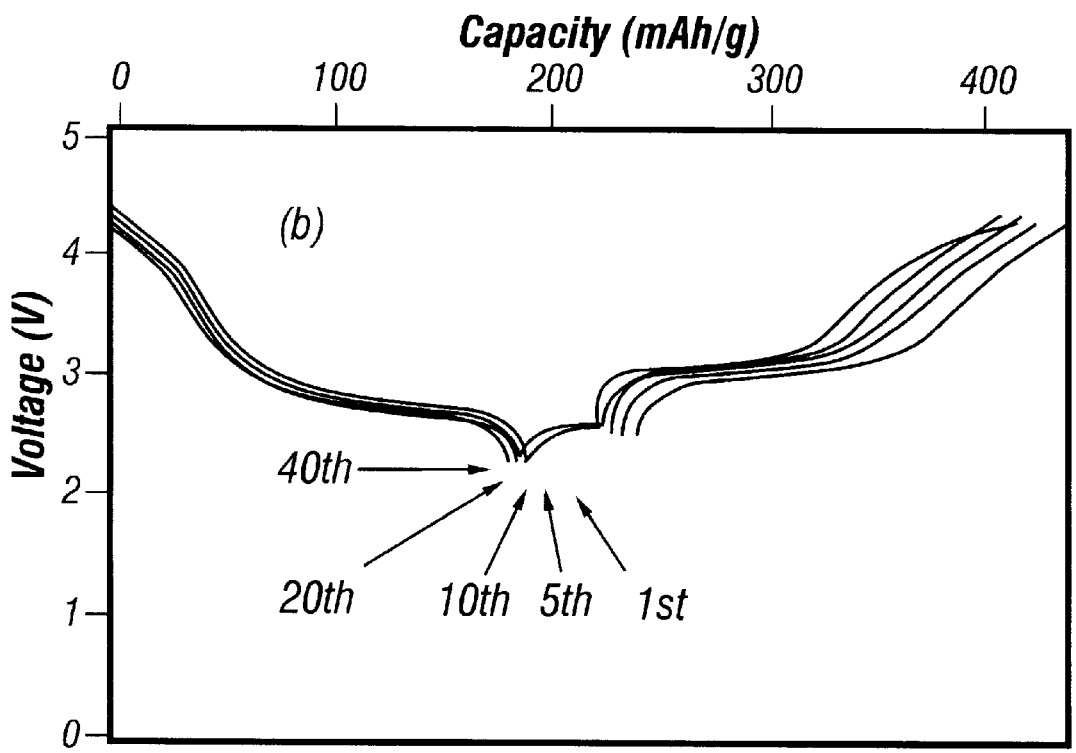
Figure 4C:
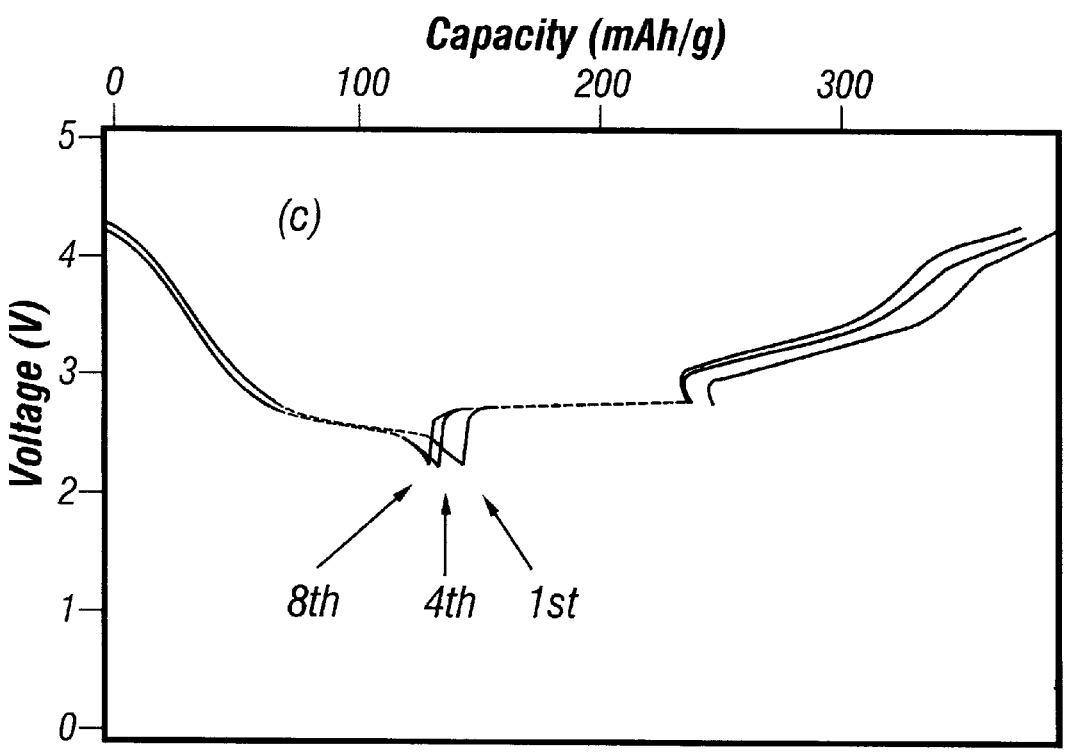
Figure 4D:
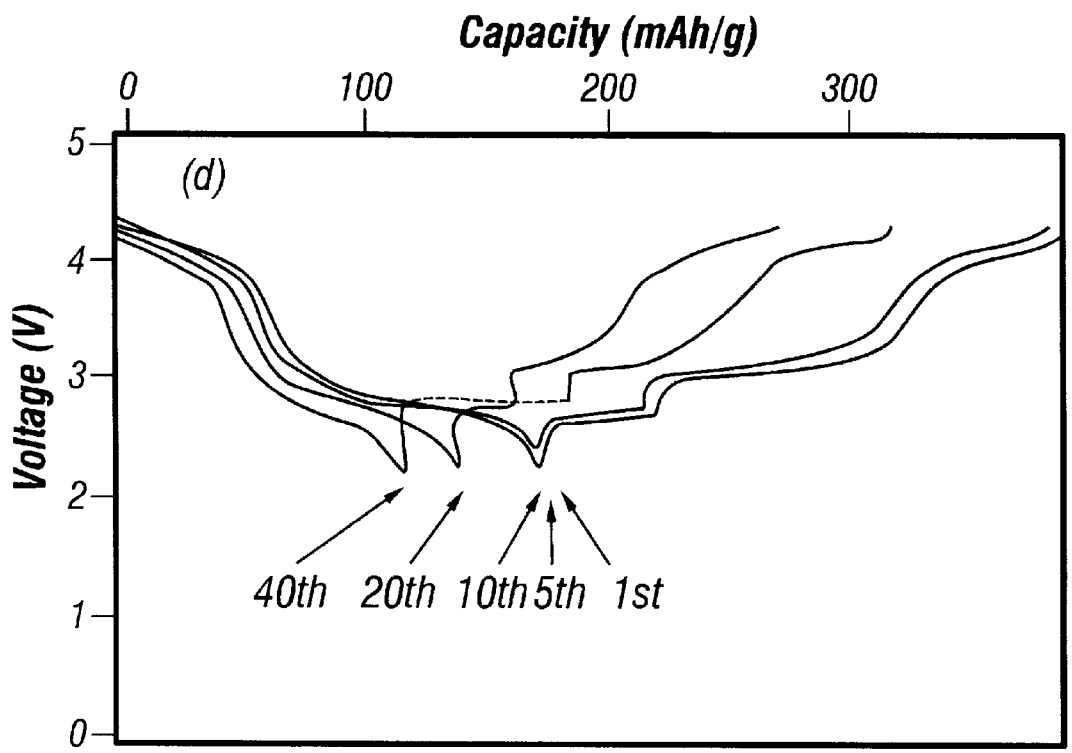

FIG. 1 shows x-ray diffraction patterns of the samples MNW1–MNW5 after heating at 500° C. in air. FIG. 2 shows the x-ray diffraction patterns of the samples MNW4 and MNW5 after annealing at 700° C. and 800° C. The sample MNW1 shows $Na_{0.70}MnO_2$ as the major crystalline phase and $Li_{1+x}Mn_{2-x}O_{4+\delta}$ spinel as the minor phase. The amount of $Na_{0.70}MnO_2$ decreases and that of $Li_{1+x}Mn_{2-x}O_{4+\delta}$ increases on going from sample MNW1 to MNW5, and the sample MNW5 shows mostly the spinel $Li_{1+x}Mn_{2-x}O_{4+\delta}$.

patterns of samples MNW1–MNW3 fired at 500° C. in FIG. 1, as well as transmission electron microscopy (TEM), indicate a nanocomposite consisting of the phases $Li_{1+x}Mn_{2-x}O_{4+\delta}$ and $Na_{0.70}MnO_2$. The presence of an intimately-mixed $Na_{0.70}MnO_2$ on a nanoscale in the 500° C. sample of MNW2 may provide good capacity and excellent cyclability for the spinel phase $LiMn_2O_4$ in the 3 V region. On the other hand, the absence of $Na_{0.70}MnO_2$ in MNW4 and MNW5 may result in a very small capacity (<40 mAh/g). This appears to be consistent with observations that pure $LiMn_2O_4$ spinel phase prepared at 550° C. by a low-temperature procedure may exhibit much smaller capacity (Tsang and Manthiram, 1996), and although the electrochemical properties of orthorhombic $Na_{0.70}MnO_2$ have not been studied thus far, a similar material, orthorhombic $Na_{0.44}MnO_2$ has recently been found to be a good electrode material (Ma et al., 1993; Doeff et al., 1994; Doeff et al. 1996).

In this embodiment, the electrode material having the largest amount of $Na_{0.70}MnO_2$, sample MNW1, shows lower capacity than samples MNW2 and MNW3 in FIGS. 3A–3E. This may suggest that the large capacity observed in the 3 V region for the samples MNW2 and MNW3 may not be entirely due to the electrochemical activity of $Na_{0.70}MnO_2$. In other words, the capacity observed in the 3 V region for the samples MNW2 and MNW3 may be primarily due to the spinel phase with some contribution from $Na_{0.70}MnO_2$.

The excellent cyclability of sample MNW2, fired at 500° C., in FIG. 3B, FIG. 4B, and FIGS. 5A and 5B may suggest that $Na_{0.70}MnO_2$ assists $LiMn_2O_4$ spinel to overcome the difficulties of Jahn-Teller distortion, giving good cyclability in the 3 V region. The data reveals that both the smaller particle size of the spinel phase and the presence of an optimum amount of the second phase, $Na_{0.70}MnO_2$, may be desirable in achieving good electrochemical performance.

It is believed that the presence of the $Na_{0.70}MnO_2$ phase on a nanometer scale, as determined by TEM experiments, may help to minimize the strain associated with the Jahn-Teller distortion, thus helping to prevent the breakdown of electrical contact between particles. This type of composite electrode strategy may prove useful in better utilizing the 3 V region in $LiMn_2O_4$ spinel.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

This example describes the preparation of a typical sample of the disclosed composite material. 0.05 M sodium permanganate solution was prepared by dissolving the required amount of $NaMnO_4 \cdot H_2O$ in deionized water. The required amount of $LiI_3 \cdot H_2O$ was added, with constant stirring, to the sodium permanganate solution. After stirring for about 1 day, the solid thus formed was filtered and washed several times with water. The solid was then subjected to heat treatment. All particle size determinations were via transmission electron microscopy (TEM).

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

REFERENCES

The following references, to the extent that they provide exemplary procedural or other details supplementary to those set forth herein, are specifically incorporated herein by reference.

U.S. Pat. No. 5,419,986
Armstrong and Bruce, *Nature*, 381:449, 1996.
Doeff, Peng, Ma and De Jonghe, *J. Electrochem. Soc.*, 141:L145, 1994.
Doeff, Richardson and Kepley, *J. Electrochem. Soc.*, 143:2507, 1996.
Leroux, Guyomard, Piffard, *Solid State Ionics*, 80:307, 1995.
Ma, Doeff, Visco, De Jonghe, *J. Electrochem. Soc.*, 140:2726, 1993.
Nagaura and Tozawa, *Prog. Batteries Sol. Cells*, 9:209, 1990.
Scrosati, *J. Electrochem. Soc.*, 139:2776, 1992.
Tarascon, McKinnon, Coowar, Bowmer, Amaticci, Guyomard, *J. Electrochem. Soc.*, 141:1421, 1994.
Thackeray, David, Bruce, Goodenough, *Mater. Res. Bull.*, 18:461, 1983.
Tsang and Manthiram, *Solid State Ionics*, 89:305, 1996.
Vintins and West, *J. Electrochem. Soc.*, 144:2587, 1997.

What is claimed is:

1. A composite electrode material, comprising a two-phase composition of $Li_{1+x}Mn_{2-x}O_{4+\delta}$ and $Na_yMnO_2$, where $0 \leq x \leq 0.33$, $0 \leq \delta \leq 0.5$ and $0 \leq y \leq 1$.

2. The electrode material of claim 1, wherein said $Li_{1+x}Mn_{2-x}O_{4+\delta}$ and said $Na_yMnO_2$ comprise nanometer size particles.

3. The electrode material of claim 2, wherein the oxidation state of manganese lies in a range from about 3.0+ to about 4.0+.

4. An electrode material comprising a two-phase composition of $Li_{1+x}Mn_{2-x}O_{4+\delta}$ and $Na_yMnO_2$, where $0 \leq x \leq 0.33$, $0 \leq \delta \leq 0.5$ and $0 \leq y \leq 1.0$, said electrode material prepared by a process comprising:
   a) obtaining aqueous solutions of $NaMnO_4 \cdot H_2O$ and $LiI \cdot 3H_2O$ at ambient temperatures;
   b) mixing said aqueous solutions together to obtain a precipitate; and
   c) heating said precipitate to from about 400° C. to about 800° C. for a period of time sufficient to form $Li_{1+x}Mn_{2-x}O_{4+\delta}$ and $Na_yMnO_2$ in two phases.

5. The electrode material of claim 4, wherein said heating comprises heating said precipitate to from about 500° C. to about 800° C. for a period of time sufficient to form $Li_{1+x}Mn_{2-x}O_{4+\delta}$ and $Na_yMnO_2$ in two phases.

6. The electrode material of claim 4, wherein said heating comprises heating said precipitate to about 500° C. for a period of time sufficient to form $Li_{1+x}Mn_{2-x}O_{4+\delta}$ and $Na_yMnO_2$ in two phases.

7. The electrode material of claim 4, wherein said process further comprises ion exchange of sodium in said $Na_yMnO_2$ with a lithium salt.

8. The electrode material of claim 7, Wherein said lithium salt comprises $LiCF_3SO_3$ to produce $Na_{y-\eta}Li_\eta MnO_{2+\delta}$, wherein $0 \leq \eta \leq y$.

9. The electrode material of claim 4, wherein said process further comprises extraction of sodium in said $Na_yMnO_2$ with an oxidizing agent.

10. The electrode material of claim 9, wherein said oxidizing agent comprises iodine to produce $Na_{y-\eta}MnO_{2+\delta}$, wherein $0 \leq \eta \leq y$.

11. The electrode material of claim 4, wherein the precipitate is heated for about 24 hours in air.

12. The electrode material of claim 4, wherein the precipitate is heated for about 3 days in air.

13. The electrode material of claim 4, wherein the molar ratio of $NaMnO_4 \cdot H_2O:LiI \cdot 3H_2O$ is about 1:0.5.

14. The electrode material of claim 4, wherein the molar ratio of $NaMnO_4 \cdot H_2O:LiI \cdot 3H_2O$ is about 1:1.

15. The electrode material of claim 4, wherein the molar ratio of $NaMnO_4 \cdot H_2O:LiI \cdot 3H_2O$ is about 1:2.

16. The electrode material of claim 4, wherein the molar ratio of $NaMnO_4 \cdot H_2O:LiI \cdot 3H_2O$ is about 1:4.

17. The electrode material of claim 4, wherein the molar ratio of $NaMnO_4 \cdot H_2O:LiI \cdot 3H_2O$ is about 1:8.

18. A process for preparing an electrode material comprising $Na_yMnO_{2+\delta}$, wherein $0 \leq y \leq 1.0$ and $0 \leq \delta \leq 0.5$, said process comprising:
   a) obtaining an aqueous solution of $NaMnO_4 \cdot H_2O$ and an aqueous solution of NaI at ambient temperatures;
   b) mixing said aqueous solutions together to obtain a precipitate; and
   c) heating said precipitate to from about 400° C. to about 800° C. for a period sufficient to form $Na_yMnO_{2+\delta}$.

19. The process of claim 18, wherein said heating comprises heating said precipitate to from about 500° C. to about 800° C. for a period sufficient to form $Na_yMnO_{2+\delta}$.

20. The process of claim 18, wherein said heating comprises heating said precipitate to about 500° C. for a period sufficient to form $Na_yMnO_{2+\delta}$.

21. The process of claim 18, wherein heating said precipitate comprises heating in air.

22. The process of claim 18, wherein heating said precipitate comprises heating in nitrogen.

23. The process of claim 18, wherein said process further comprises ion exchange of sodium in said $Na_yMnO_{2+\delta}$ with a lithium salt.

24. The process of claim 23, wherein said lithium salt comprises $LiCF_3SO_3$ to produce $Na_{y-\eta}Li_\eta MnO_{2+\delta}$, wherein $0 \leq \eta \leq y$.

25. The process of claim 18, wherein said process further comprises extraction of sodium in said $Na_yMnO_{2+\delta}$ with an oxidizing agent.

26. The process of claim 25, wherein said oxidizing agent comprises iodine to produce $Na_{y-\eta}MnO_{2+\delta}$, wherein $0 \leq \eta \leq y$.

27. A process for producing a two phase composition of $Li_{1+x}Mn_{2-x}O_{4+\delta}$ and $Na_yMnO_2$, where $0 \leq x \leq 0.33$, $0 \leq \delta \leq 0.5$ and $0 \leq y \leq 1$, comprising:
   a) obtaining aqueous solutions of $NaMnO_4 \cdot H_2O$ and $LiI \cdot 3H_2O$ at ambient temperatures;
   b) mixing said aqueous solutions together to obtain a precipitate; and
   c) heating said precipitate to from about 400° C. to about 800° C. for a period of time sufficient to form $Li_{1+x}Mn_{2-x}O_{4+\delta}$ and $Na_yMnO_2$ in two phases.

28. The process of claim 27, wherein said heating comprises heating said precipitate to from about 500° C. to about 800° C. for a period of time sufficient to form $Li_{1+x}Mn_{2-x}O_{4+\delta}$ and $Na_yMnO_2$ in two phases.

29. The process of claim 27, wherein said heating comprises heating said precipitate to about 500° C. for a period of time sufficient to form $Li_{1+x}Mn_{2-x}O_{4+\delta}$ and $Na_yMnO_2$ in two phases.

30. The process of claim 27, wherein said precipitate is heated in nitrogen.

31. The process of claim 27, wherein the molar ratio of $NaMnO_4 \cdot H_2O:LiI \cdot 3H_2O$ is about 1:0.5.

32. The process of claim 27, wherein the molar ratio of $NaMnO_4 \cdot H_2O:LiI \cdot 3H_2O$ is about 1:1.

33. The process of claim 27, wherein the molar ratio of $NaMnO_4 \cdot H_2O:LiI \cdot 3H_2O$ is about 1:2.

34. The process of claim 27, wherein the molar ratio of $NaMnO_4 \cdot H_2O:LiI \cdot 3H_2O$ is about 1:4.

35. The process of claim 27, wherein the molar ratio of $NaMnO_4 \cdot H_2O:LiI \cdot 3H_2O$ is about 1:8.

36. The process of claim 27, wherein said precipitate is heated in air.

37. The process of claim 36, wherein said precipitate is heated to about 500° C. for about 24 hours.

38. The process of claim 36, wherein said precipitate is heated to about 500° C. for about 3 days.

39. The process of claim 36, wherein said precipitate is heated to about 700° C. for about 24 hours.

40. The process of claim 36, wherein said precipitate is heated to about 800° C. for about 24 hours.

* * * * *